W. T. NEESHAM.
DINNER BUCKET.
APPLICATION FILED MAY 3, 1911.
1,015,455.
Patented Jan. 23, 1912.
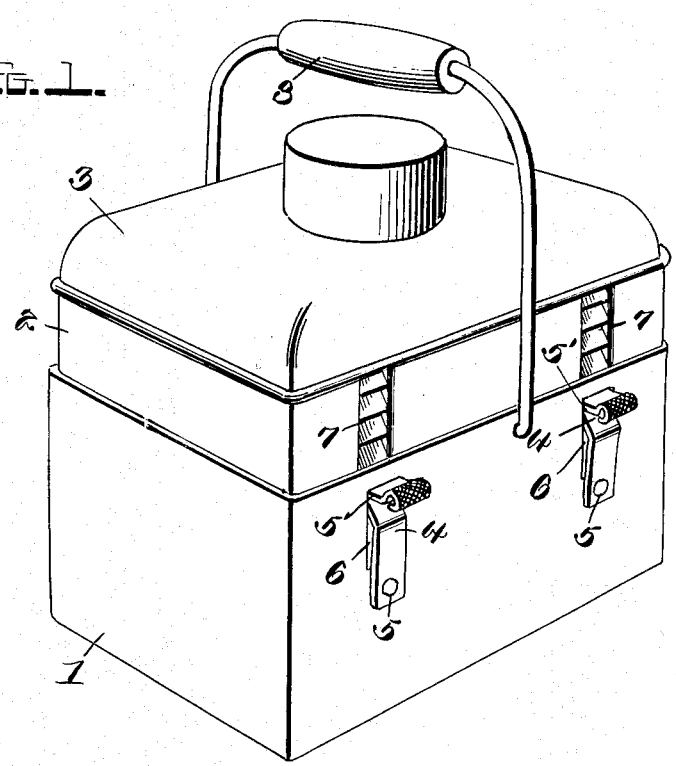
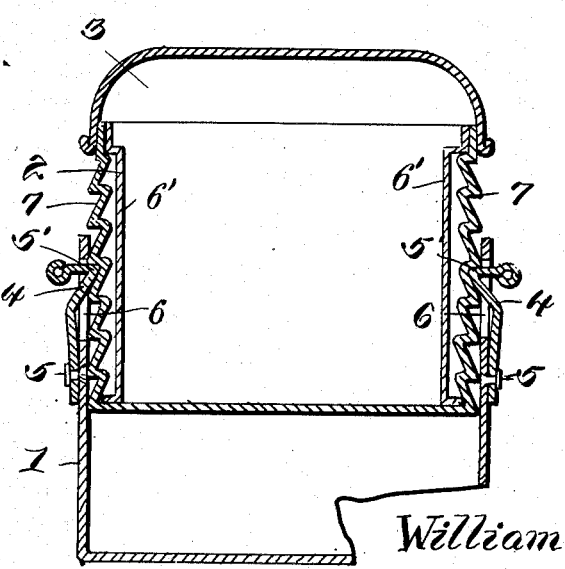
Witnesses
Chas. L. Griesbauer.
H. E. Coleman.
Inventor
William T. Neesham.
By Watson E. Coleman.
Attorney

UNITED STATES PATENT OFFICE.

WILLIAM T. NEESHAM, OF SOMERSET, COLORADO.

DINNER-BUCKET.

1,015,455. Specification of Letters Patent. Patented Jan. 23, 1912.

Application filed May 3, 1911. Serial No. 624,782.

*To all whom it may concern:*

Be it known that I, WILLIAM T. NEESHAM, a citizen of the United States, residing at Somerset, in the county of Gunnison and State of Colorado, have invented certain new and useful Improvements in Dinner-Buckets, of which the following is a specification, reference being had to the accompanying drawings.

My invention relates to new and useful improvements in dinner buckets and has for its object the provision of a bucket of this character in which the upper compartment can be adjusted so as not to come in contact with the contents of the lower compartment.

Another object of my invention is to provide a bucket of this character which will possess advantages in points of efficiency, durability, is inexpensive of manufacture and at the same time being simple in construction and operation.

With the above and other objects in view the invention consists in the novel construction and the combination and arrangement of parts hereinafter more fully described, pointed out in the claim and shown in the accompanying drawings in which—

Figure 1 is a perspective view of my bucket showing my improvement; and Fig. 2 is a transverse sectional view.

In constructing my improved bucket it is preferably made in two compartments, a lower compartment 1 and an upper compartment 2, the upper compartment 2 being provided with the cover 3. Secured to the outer side of the lower compartment are the flat springs 4 riveted to the compartment 1 at 5 and having their free ends bent upon themselves to form rests or stops 5' which are adapted to be disposed through the transverse slots 6 formed in the upper edge of the lower compartment. The upper compartment 2 is provided with the vertically disposed rows of notches or teeth 7 which are adapted to be engaged by the stops or rests 5' secured to the side of the lower compartment 1. A casing 6' is provided and secured to the inner side of the upper compartment and adapted to inclose the notches 7 to form a smooth surface on the inner side of the upper compartment. In separating the compartments, the vertical series of notches in the sides of the upper compartment will vibrate somewhat, as will be readily seen from the following description. In order to permit of this vibration, the casing 6' are spaced from the notches 7, as clearly shown in Fig. 2. The lower compartment is also provided with the usual bail carrying handle 8. To insure a securely substantial support for the upper compartment the stops 5' are arranged in pairs upon each side of the bucket and the rows of notches 7 are also arranged in pairs upon each side of the upper compartment. In inserting the upper compartment into the lower one the stops 5' are pressed outwardly by the fingers and the upper compartment is then lowered to any required position and held by means of the stops 5' engaging in the notches 7. When it is desired to remove the upper compartment it is simply lifted upward and the stops 5' will slide down on the inclined portions 9 of the notches 7.

It will be obvious that various changes in the details of construction and in the proportions may be resorted to for successfully carrying the invention into practice without sacrificing any of the novel features or departing from the scope thereof.

What I claim is:

A receptacle of the character described comprising upper and lower compartments, said upper compartment telescoping within the lower compartment and having a plurality of vertical series of notches formed in its side walls, said lower compartment having openings in its side walls in line with said notches, leaf springs rigidly fixed at one of their ends to the side walls of the lower compartment and beneath the openings therein, said springs being inwardly inclined intermediate of their ends and disposed through said openings, the free ends of said springs being bent upon themselves and outwardly disposed through the openings of the lower compartment, said springs at the latter bend thereof engaging with the notches in the walls of the inner compartment and forming stops to limit the downward movement of said compartment, and vertically disposed casings arranged upon the inner faces of the side walls of the upper compartment and in spaced relation to the vertical series of notches therein.

In testimony whereof I hereunto affix my signature in the presence of two witnesses.

WILLIAM T. NEESHAM.

Witnesses:
EARL V. HILLS,
RALPH H. NEESHAM.